United States Patent [19]

Alfter et al.

[11] 4,073,535
[45] Feb. 14, 1978

[54] AUTOMOBILE ROOF INTERIOR LININGS AND METHOD OF INSTALLATION

[75] Inventors: Franz-Werner Alfter, Siegburg; Hans-Ulrich Breitscheidel, Troisdorf; Cosmas Lorry, Niederkassel-Rheidt, all of Germany

[73] Assignee: Dynamit Nobel Aktiengesellschaft, Germany

[21] Appl. No.: 561,167

[22] Filed: Mar. 24, 1975

[30] Foreign Application Priority Data

Apr. 10, 1974 Germany .............................. 2417491

[51] Int. Cl.² .............................................. B60J 7/00
[52] U.S. Cl. .................................. 296/137 A; 29/450; 29/453; 52/403; 156/60; 296/31 R
[58] Field of Search ............. 296/137 R, 137 A, 39 R, 296/31 R, 31 P; 52/400, 403, 222, 397; 428/177, 192, 193, 194; 29/450, 453, DIG. 1; 156/60, 160

[56] References Cited

U.S. PATENT DOCUMENTS

| 1,850,705 | 3/1932 | Carlson | 296/137 A |
| 1,895,567 | 1/1933 | Blum | 428/192 X |
| 2,624,614 | 1/1953 | Kramer | 296/137 R |
| 2,768,026 | 10/1956 | Stephens | 296/137 A |
| 3,252,732 | 5/1966 | Squier | 296/137 A |
| 3,620,906 | 11/1971 | Hannes | 296/137 A X |
| 3,851,432 | 12/1974 | Griffin | 52/400 |

FOREIGN PATENT DOCUMENTS

| 2,036,195 | 12/1970 | France | 296/39 |
| 1,555,222 | 8/1970 | Germany | 296/137 A |
| 771,176 | 3/1957 | United Kingdom | 296/137 R |
| 832,731 | 4/1960 | United Kingdom | 296/137 A |

Primary Examiner—Robert J. Spar
Assistant Examiner—Winston H. Douglas
Attorney, Agent, or Firm—Craig & Antonelli

[57] ABSTRACT

An adhesive interior or dome lining is provided for the interior of a vehicle roof with the central portion of the dome lining being adhesively secured to the roof while free edges of the dome lining are inserted into the gap formed between the roof and the interior roof strut. A profiled member of a soft foam material is provided adjacent the gap with the free end of the dome lining passing over the profiled member to be clampingly engaged into the gap by the compressive forces of the foam material. A method for installing this arrangement is further provided.

21 Claims, 6 Drawing Figures

AUTOMOBILE ROOF INTERIOR LININGS AND METHOD OF INSTALLATION

The present invention relates to an elastic, adhesive interior lining or dome lining of a preferably upholstered, padded, elastic or flexible material for automotive vehicle roof structures of the type having a gap between the vehicle roof and a roof strut or profiled member extending around the interior of the vehicle roof.

Essentially three types of car domes or headliners have been contemplated for lining the interior of roofs for automotive vehicles. Firstly, there is the hoop-frame dome or liner made of artificial leather with tensioning wires provided on felt supports, wherein the hoops require an appropriate mounting to the vehicle roof. Furthermore, there is the car dome of a self-supporting design, consisting of bend-resistant materials or of materials having bend-resistant inserts, and which must also be mounted to the car body along edge zones of the roof. Moreover, there is the so-called adhesive dome lining which is constructed in most cases of soft materials having a padding or upholstering effect, which materials are not self-supporting. Such an adhesive dome lining is glued to the vehicle roof; however, a problem arises during the mounting thereof and with a smooth structural appearance of the edge of the adhesive dome lining at its transition to the car body.

Since the bodies of the various automobiles are of different designs, it is impossible to find a solution identically applicable to all automotive vehicles. The present invention provides an improvement to those automotive vehicles wherein a roof strut or frame profile member extends around the interior of the roof edge, and where a more or less large gap or separation exists between the vehicle roof and the roof strut extending in a continuous fashion.

This gap, effected by the manner of automobile body manufacture and construction, has widely varying dimensions ranging over several millimeters, so that it is extraordinarily difficult to provide, by means of conventional adhesive dome linings, a flawless edge appearance and a clean transition from the adhesive dome to the roof strut. The continuous gap, produced by the assembly of the body, between the top edge of the roof spar, and the vehicle roof differs considerably in size due to assembly tolerances. This holds true between different ones of the automobile, as well as within the same automobile.

If a flawless adhesive dome lining is to be produced, it is necessary to locate the terminal edge of the adhesive dome behind the roof strut. Thus, the edge of the adhesive dome must be inserted into the gap between the roof strut and the vehicle roof. It has been contemplated to accomplish this structure by gluing the adhesive dome also in the zone within the roof strut beyond the gap between the roof and roof strut, but this connecting is achieved with considerable expenditure in order to apply the adhesive behind the roof strut and when further mounting the adhesive dome. Moreover, due to the varying gap dimensions, a further separation frequently remains between the adhesive dome lining and the roof strut, which is undesirable. It may be possible to seal this remaining gap between the adhesive dome lining and the roof strut after installation of the dome by means of a special profile, however, additional, new transition zones are produced which are considered as troublesome as the original transition zones of the adhesive dome lining to the roof strut, especially in the corners.

According to the present invention, this problem of a flawless edge seal between the adhesive dome lining and the roof strut is solved by the use of a profiled strip of an elastic, compressible material, e. g. soft foam material, formed preferably with a triangular or tear-drop-shaped cross section, between the vehicle roof and the adhesive dome lining near the zone of the gap. Advantageously, the profiled strip can be attached to the vehicle roof. However, it is also possible to join the profiled strip to the adhesive dome lining prior to the mounting of the latter.

The present invention further provides that such a strip, consisting of an elastic material such as soft foam material and having preferably a triangular, wedge-shaped, or tear-drop-shaped cross section, is mounted, as an integral continuous element on the roof surface adjacent the roof strut prior to the insertion of the car dome lining, for example, by glue. The dimensions of this strip are selected in order to enable the subsequently glued-in dome lining to be pressed securely against the sealing edge of the roof strut, thereby taking the occurring tolerances into account. This means, therefore, that by the use of an elastic and compressible profiled strip reduction of the occurring gap between the vehicle roof and the roof strut is effected so that, after the introduction of the adhesive dome lining proper, the gap is in each case sealed off with certainty, and the adhesive dome lining is clamped between the roof and the roof strut.

A further aspect of the present invention resides in a manufacturing process in which the adhesive dome lining is first glued firmly in the zone of the vehicle roof and then the continuous, loose edge of the dome lining is pressed into the gap by means of a pressure tool, e.g. a flat roller, between the roof strut and the vehicle roof, past the profiled strip while the latter is elastically deformed. After the dome lining edge has been pressed into place through the gap and the pressure tool has been removed, the profiled strip can expand and presses the dome lining edge, during this step, firmly against the terminal edge of the roof strut.

Adhesive dome linings according to this invention suitably include, for example, those made of a soft foam sheet, e. g. crosslinked polyethylene foam material or polyurethane soft foam, laminated on the side facing the interior of the vehicle with a decorative material, such as an artificial leather film. Also adhesive dome linings of a fabric, knit, non-woven material, or the like of fibers, e. g. jute felt, coated with a thermoplastic synthetic resin, e. g. PVC, can be advantageously employed. Moreover, the surface of the adhesive dome lining facing the interior of the vehicle can be embossed. The adhesive dome lining may be produced of a single sheet of foam material, wherein the surfaces can optionally be compressed and/or embossed. Such adhesive dome linings have the advantage that they occupy a relatively small amount of space, are extraordinarily light-weight, yet offer a certain padding effect, and can be mounted without difficulty by simple means.

Thus, the structure provided by the present invention eliminates the affect of the considerable dimensional tolerances between the vehicle roof and the edge of the vehicle roof formed by the roof strut, occurring due to the assembly of the car body parts by sealing off the gap continuously, all around the periphery of the roof interior, so that noises, windy air, and drafty air are excluded. Furthermore, optically flawless impression and appearance is created. Moreover, a rugged, smooth surface can be formed by composite materials, which surface is easy to clean and furthermore is not interrupted by clamping brackets or the like. The assembly is exceedingly simple: no preliminary work is required for its installation including on the car body, such as, for example, the punching of holes or the like, and there is no need for the use of appliances taking a large amount of effort, such as welding machines.

The invention is illustrated without restriction thereto in one embodiment in the drawings and will be explained in greater detail with reference thereto in the following.

Figure 1:
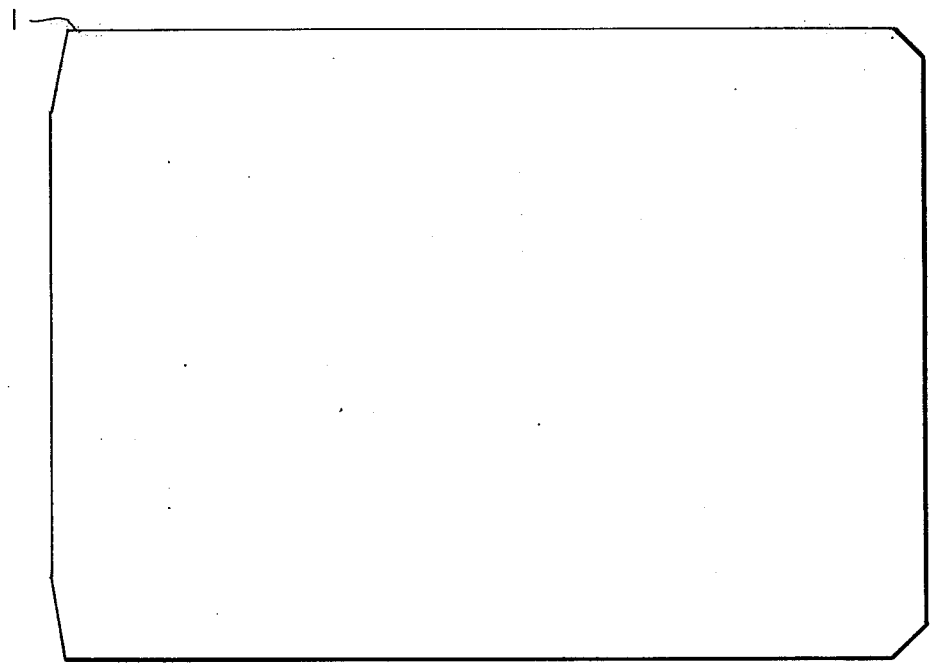
FIG. 1 shows an adhesive dome lining in a top view prior to installation.

For lining automotive vehicle roof interiors with an adhesive dome lining, a cut-to-size adhesive dome lining 1 is fashioned in correspondance with the size of the roof to be lined, as shown, by way of example, in FIG. 1. Especially suitable materials for the adhesive dome lining 1 are elastic materials providing a padding or upholstering effect, such as soft foam materials, for example. Suitable examples for such soft foam materials are cross-linked polyethylene foam materials or polyurethane soft foam, wherein the dome lining can be of one layer or also mutli-layered, as required. Advantageously, the dome lining can also be laminated with a thin sheet on its side facing the vehicle interior, for example with an artificial leather layer which can optionally also be embossed. It is furthermore possible to use foam materials fashioned with a compressed and optionally embossed or profiled surface. Examples for the construction of the adhesive dome lining according to the present invention will be set forth further below.

Figure 2B:
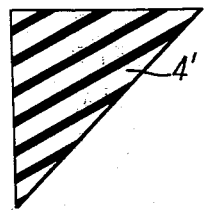
FIGS. 2a, 2b, 2c show the various cross sections of a profiled strip according to the present invention before installation.
Figure 2A:
Figure 2C:

The profiled strips 4, 4', and 4'' illustrated in cross section in FIG. 2a, 2b, 2c, is the element which bridges the dimensional tolerances of the gap at the edge of the roof construction, and simultaneously effects the mounting of the edge of the adhesive dome lining to the car body. The profiled strip 4 is preferably fashioned with a thickened end, such that this strip can have a triangular, wedge-shaped, or tear-shaped cross section. The profiled strip 4 must consist of an elastic and well compressible material, for example, of a soft foam material such as polyurethane soft foam or PVC soft foam.

Figure 3:
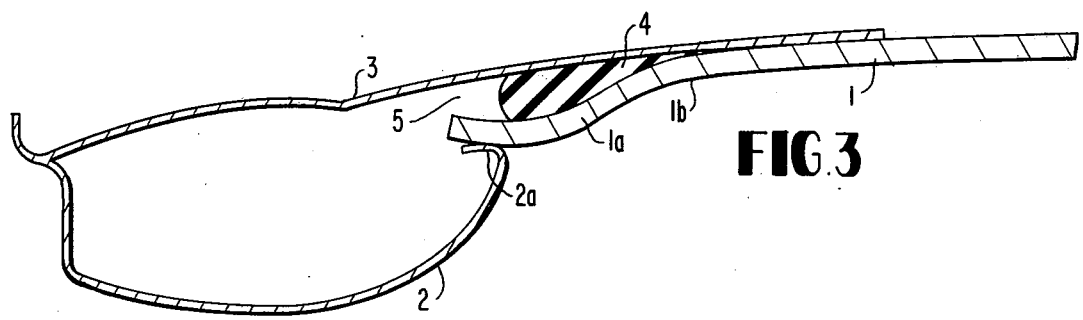
FIG. 3 shows a partial cross section through an automobile body at an edge mounting of the dome lining.

FIG. 3 shows the adhesive dome lining 1 in the installed condition within the car body, in a cross-sectional fragmentary view. The vehicle roof 3 is formed along its edge zone with a roof strut 2, extending into the interior of the vehicle. Between the vehicle roof 3 and the roof strut 2, a gap 5 occurs which varies in its size. In the zone of the gap 5, the top edge 2a of the roof strut is bent inwardly. The profiled strip 4 is attached, adjacent the zone of the gap 5 in front of the edge 2a of the roof strut 2, to the vehicle roof 3, for example by gluing. The adhesive dome lining 1 is likewise glued to the vehicle roof 3 at least at the central area of the vehicle roof 3 bounded by the profiled strip 4, and the free end 1b of the adhesive dome lining 1 is pressed into the gap 5 between the roof strut 2 and the vehicle roof 3 in the edge zone, with the free end portion 1a extending over the profiled strip 4 and past the latter. During this step, the profiled strip 4 is compressed. After the edge 1b of the dome lining has been introduced into the gap 5, the elasticity of the profiled strip 4 presses the edge of the dome lining against the top edge 2a of the roof strut 2, so that the dome lining is firmly clamped in this zone and a flawless, tight junction is produced. The same procedure can be followed if the profiled strip is previously attached to the adhesive dome lining prior to assembly.

Figure 4:
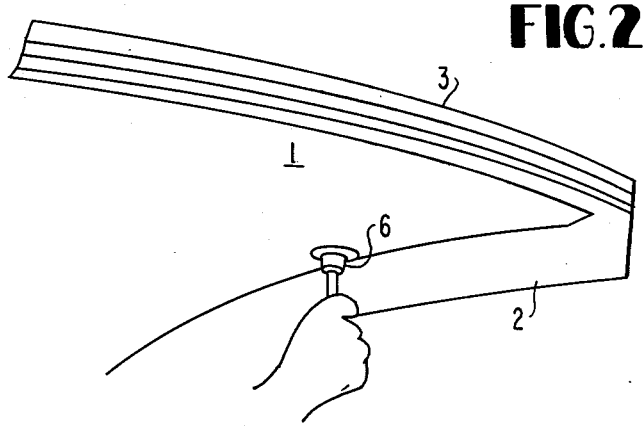
FIG. 4 shows a fragmentary view of the mounting process for the adhesive dome lining in the edge zone.

FIG. 4 shows an example of the process according to the present invention for installing the adhesive dome lining 1 to the vehicle roof 3. After the cut-to-size piece of the dome lining 1 and the profiled strip 4 have been placed in position in relation to the vehicle roof 3, and adhesive, tackifier, glue, or the like, depending on the material of the profiled strip to be applied, is applied on the vehicle roof along the edge of the roof strut approximately in the width of the profiled strip. Thereafter, the profiled strip is mounted in place on the vehicle roof 3. Then, the entire interior roof surface within the mounted continuous profiled strip 4 is subjected to a spray of an adhesive, tackifier, glue, or the like, or such agents are applied by spreading, etc. whereupon the adhesive dome lining 1 is pressed against the structure and secured in place. Thereafter, the still loose edges of the dome lining are pressed, by means of the pressure roller 6 shown in FIG. 4, past the profiled strip 4 and into the gap 5 above the bent edge 2a of the strut 2, whereby the profiled strip 4 is compressed. By the expansion of the profiled strip 4 upon the release of the pressure roller 6, the dome lining edge is then clamped into position and the gap is sealingly closed.

The following are several examples for the process of the present invention for mounting the adhesive dome lining.

EXAMPLE 1

A triangular foam strip of polyurethane soft foam having a weight per unit volume of 60 kg./m$^3$ and the dimensions of 35 × 15 mm. is glued continuously into the car body adjacent the gap zone of the roof and roof strut. Thereafter, the undeformed adhesive dome lining is glued into place; this lining consists of a cross-linked polyethylene foam material of high-pressure polyethylene made of 15.1% azodicarbonamide as the blowing agent, 1% dicumyl peroxide as the cross-linking agent, and 6% vinyl acetate, weight per unit volume 30 kg./m$^3$, flame-laminated with an artificial leather of PVC on tricot with a weight per unit area of about 360 g. /m$^2$. The adhesive gluing agent is a solvent adhesive. It is advantageous, when using a solvent adhesive, to ventilate the vehicle roof for 1-10 minutes before gluing the dome lining into place, to allow the solvent vapor to escape. Subsequently, the continuous edge of the dome lining is pressed into the gap by means of a pressure tool, e.g. a flat roller.

EXAMPLE 2

In place of a polyurethane soft foam strip, a PVC soft foam strip is utilized having a weight per unit volume of 100 kg. /m$^3$. In place of the artificial leather, a velour-type knit is flame-laminated to the cross-linked polyethylene foam sheet. The remaining description corresponds to Example 1.

EXAMPLE 3

A foam strip as described in Example 1 is utilized. The adhesive dome lining consists of a jute felt having a thickness of about 3 mm. and being coated on one side, namely the visible side, with PVC, the coating having a thickness of about 300 microns.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. An interior lining arrangement for vehicles having a roof structure, said arrangement comprising a roof strut member forming a gap with the interior side of a vehicle roof, a non-self-supporting lining means at least partially adhesively secured to said roof for providing interior lining for said vehicle roof, said lining means having at least one free edge passing through said gap, and profiled strip means adjacent said gap for clamping a part of the lining means immediately adjacent to said free edge against said roof strut member at said gap, said profiled strip means being a profiled, continuous elongated member of elastic, compressible material, said elongated member being disposed along the entire length of said gap extending around the interior periphery of said vehicle roof.

2. An arrangement according to claim 1, wherein said elongated member has a cross-sectional profile being one of a triangular shape, a wedge-shape and a teardrop shape.

3. An arrangement according to claim 2, wherein a thick portion of said profiled strip means faces said gap.

4. An arrangement according to claim 1, wherein said elongated member is of a soft foam material.

5. An arrangement according to claim 4, wherein said soft foam material of said elongated member is selected from the group consisting of polyurethane soft foam or PVC soft foam.

6. An arrangement according to claim 1, wherein said elongated member is secured to said interior side of said vehicle roof.

7. An arrangement according to claim 6, wherein said non-self-supporting lining means is secured to said interior side of said vehicle roof within the area defined by said elongated member.

8. An arrangement according to claim 1, wherein said elongated member is secured to said non-self-supporting lining means, and said non-self-supporting lining means is secured to said interior side of said vehicle roof within the area defined by said elongated member.

9. An arrangement according to claim 1, wherein said non-self-supporting lining means includes a sheet of a soft foam material.

10. An arrangement according to claim 9, wherein said soft foam material of said sheet is selected from the group consisting of cross-linked polyethylene foam or polyurethane soft foam.

11. An arrangement according to claim 9, wherein said non-self-supporting lining means further includes an artificial leather laminate at the visible side of said sheet.

12. An arrangement according to claim 11, wherein said laminate includes decorative embossments at the visible side thereof.

13. An arrangement according to claim 9, wherein said sheet includes decorative embossments at the visible side thereof.

14. An arrangement according to claim 1, wherein said non-self-supporting lining means includes a layer of one of a woven fabric and a non-woven web of fibers, said layer being coated with a thermoplastic synthetic resin.

15. An arrangement according to claim 14, wherein said layer consists of a jute felt, and said thermoplastic resin is PVC.

16. An arrangement according to claim 1, wherein said roof strut includes a rounded edge portion facing said vehicle roof to form said gap.

17. A process for installing an interior lining in a vehicle having a roof structure, said process comprising the steps of securing a profiled strip member to the interior side of a vehicle roof along a gap formed between an interior roof strut and the interior side of said roof, securing a non-self-supporting lining member to said roof within the area defined between said profiled strip member, passing a free end of said lining member over said profiled strip member, and inserting said free end through said gap while compressing said profiled strip member, thereby clamping a part of the lining means immediately adjacent to said free end within said gap.

18. A process according to claim 17, wherein said step of securing said profiled strip member to the interior side of said roof includes the steps of applying a first adhesive agent to said interior side of said roof along said gap, and adhering said profiled strip member to said first adhesive agent; and wherein said step of securing said lining member to said roof includes the steps of applying a second adhesive agent to the interior side of said roof within said area defined between said profiled strip member, and adhering said lining member to said second adhesive agent.

19. A process according to claim 18, wherein said first and second adhesive agents are applied simultaneously.

20. A process according to claim 18, wherein said steps of applying said first and second adhesive agents include spraying said adhesive agents on said roof.

21. A process according to claim 17, wherein said steps of inserting and compressing are performed by a pressure roller.

* * * * *